(12) United States Patent  (10) Patent No.: US 8,622,417 B1
Schneider et al.  (45) Date of Patent: Jan. 7, 2014

(54) AIRBAG WITH LOW-VOLUME STRUCTURE

(75) Inventors: David W. Schneider, Waterford, MI (US); Chandler Macocha, Oxford, MI (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/541,987

(22) Filed: Jul. 5, 2012

(51) Int. Cl.
*B60R 21/233* (2006.01)
*B60R 21/2338* (2011.01)

(52) U.S. Cl.
USPC ...................... 280/729; 280/730.1; 280/743.2

(58) Field of Classification Search
USPC .......................... 280/729, 743.2, 730.1, 743.1
See application file for complete search history.

(56) References Cited

U.S. PATENT DOCUMENTS

| | | | |
|---|---|---|---|
| 3,784,225 A | | 1/1974 | Fleck et al. |
| 3,929,350 A | * | 12/1975 | Pech .............................. 280/729 |
| 5,839,139 A | * | 11/1998 | Fink .................................. 5/648 |
| 7,025,376 B2 | | 4/2006 | Dominissini |
| 2004/0174003 A1 | * | 9/2004 | Dominissini ................. 280/729 |
| 2011/0001307 A1 | * | 1/2011 | Mendez ......................... 280/729 |
| 2012/0193896 A1 | * | 8/2012 | Turnbull et al. .............. 280/729 |

FOREIGN PATENT DOCUMENTS

| | | |
|---|---|---|
| EP | 1 364 838 A2 | 11/2003 |
| GB | 1 362 672 | 12/1970 |
| WO | WO 2006/041345 A1 | 4/2006 |

OTHER PUBLICATIONS

PCT International Search Report—Dec. 9, 2005.

* cited by examiner

*Primary Examiner* — Drew Brown
(74) *Attorney, Agent, or Firm* — Brinks Gilson & Lione

(57) ABSTRACT

A frontal airbag has a first section, a second section, and a third section, the second section being in fluid communication with both the first and the third section. The first, second and third sections form a triangular structure upon inflation of the airbag. A gas generator is attached to the first section and in fluid communication with the first section. An end portion on the third section remote from the second sections attached to the first section in an area between the gas generator and the second section. Two side tethers attached to the first section and to one of the second and third sections or near transitional bend between the second and third section provide resistance against flattening of the airbag after inflation. The first section and the third section are directly attached to each other by a seam, by an adhesive, or by lamination.

10 Claims, 6 Drawing Sheets

AIRBAG WITH LOW-VOLUME STRUCTURE

FIELD OF THE INVENTION

The invention relates to a frontal airbag arrangement for the protection of seat occupants in a motor vehicle.

BACKGROUND OF THE INVENTION

Airbags have been credited for saving lives by damping impact of a motor vehicle crash on a vehicle occupant. Not only frontal impact airbags are in use, but also side impact airbags, such as side curtain airbags expanding from the roof line of a vehicle or airbags arranged in a center console or armrest between two car seats. After the gas generator is triggered, the airbag unfolds and provides energy absorption for the seat occupant. An airbag arranged in an armrest pushes itself between the seats and between seat occupants sitting next to each other. Another known airbag design provides an airbag in the vicinity of the center tunnel of the vehicle that inflates above the heads of the vehicle occupants to protect the occupants in the event of a vehicle rollover or of an "off-side" impact.

Airbags are designed to provide a synergetic effect with seat belts that restrain seat occupants in a defined position. At least the front seats of a passenger vehicle and increasingly also the rear seats are provided with three-point seatbelts comprising a lap belt and a shoulder harness extending diagonally across a seat occupant's chest. The shoulder harness limits the forward movement of a seat occupant's upper body in the event of a frontal impact.

In contrast, aircraft passenger seats are usually only equipped with a two-point seatbelt, which is a lap belt without shoulder harness. Two-point seatbelts are more comfortable to wear than three-point seatbelts that limit the range of movement of a passenger's upper body. Thus, passengers may be less likely to keep three-point seatbelts fastened for the duration of a flight. Absent a shoulder harness, in the event of a high deceleration of an aircraft, for instance during an emergency landing or a collision, the torso of a passenger is catapulted forward. This constitutes a potentially dangerous situation, where a forward excursion may result in high head accelerations and possibly head injuries from a seat back of a seat located in front of the seat occupant.

Airbags of current designs pose packaging challenges, based in part on the assumption that a large inflated volume is needed in order to provide the airbag with the sufficient energy absorption during a crash due to the force of the occupant impact. However, problems have been noted to occur with airbags of current design in that they can often be difficult to install in vehicles such as small or compact models where space in the passenger compartment is at a premium.

Moreover, such large and bulky airbags often require complex gas generator units in order to guarantee that the airbag will promptly and properly inflate during a crash. These large and bulky gas generators create additional problems because not only do they further increase the size and complexity of the airbag system, but are often also very expensive. More importantly, multiple and complex gas generators can be very difficult to assemble, install, or repair.

In an airplane with possibly hundreds of seats, large gas generators provided for every seat significantly increase the cost and weight of a passive safety system.

SUMMARY OF THE INVENTION

In one aspect of the present invention, a frontal airbag has a first, a second, and a third inflatable section. The first section is connected to a gas generator. The second section is in fluid communication with both the first and the third section. The third section has an end remote from the second section that is attached to the first section. The first, second and third section form a triangular structure upon inflation of the airbag, wherein the third section is located above the first section.

According to one embodiment, at least two side tethers may be provided of which each is arranged on either lateral side of the airbag. Each side tether may be attached to the first section and one of the second and third sections or to a transitional bend between the second and third section, thereby limiting an enveloping volume of the airbag.

According to a further aspect of the invention, the first and third sections are directly attached to each other by a seam. The term seam in this context is not limited to sewn connection and includes attachments by adhesive or lamination.

The first and third sections may further be attached to each other in portions that form uninflated areas.

Uninflated islands in the airbag may create increased structural stiffness of the airbag because a relative movement between opposing surfaces is restricted. They can also create folding lines for the airbag during deployment.

Further details and benefits of the present invention become apparent from the following description of the accompanying drawings showing various preferred embodiments. The attached drawings are included for illustrative purposes only and are not intended to limit the scope of the present invention.

DETAILED DESCRIPTION OF THE INVENTION

Figure 1:
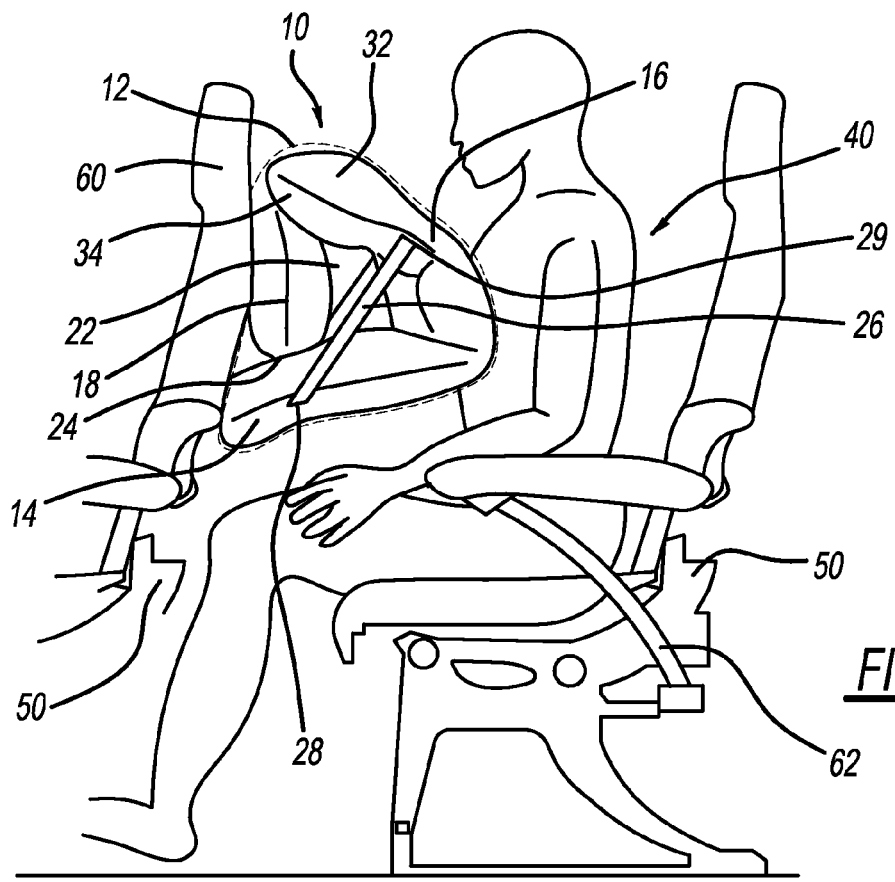
FIG. 1 shows an inflated airbag according to a first embodiment of the invention in an aircraft seating space with a seat occupant.

FIG. 1 shows a rear seat 50 located behind a front seat 50. The seat 50 features a lap belt 62 securing a seat occupant 40 in the seat 50.

The seat back 60 of the front seat 50 includes an airbag 10 that is inflated toward the seat occupant 40 during a deceleration event before the seat occupant 40 can make contact with the seat back 60. In the embodiment of FIG. 1, the airbag 10 is mounted in the lower half of the seat back 60 and expands to an enveloping volume 12 with a generally triangular cross-section. The enveloping volume 12 defines a volume that a conventional airbag would need to fill for providing outer surfaces that correspond to those of the shown embodiment.

The airbag 10 of FIG. 1 does not fill out the entire enveloping volume 12. Airbag 10 rather extends along the perimeter of the triangular cross-section of the enveloping volume 12.

The airbag 10 has a low-volume structure with generally three sections, first section 14, second section 16, and third section 18. The first, second, and third sections 14, 16, and 18 substantially form a triangle around an empty space 22. The airbag 10 has an outer fabric layer 32 and an inner fabric layer 34. The outer fabric layer 32 is configured to make contact with the seat occupant 40 and defines the enveloping volume 12, while the inner fabric layer 34 defines the empty space 22.

The first section 14 is connected to a gas generator located inside the seat back 60. The second section 16 is in fluid connection with the first section 14, and the third section 18 is in fluid connection with the second section 16. The third section 18 has an end portion 24 remote from the second section 16 that is in contact with and attached to the first section 14.

On the left side and on the right side viewed from the perspective of the seat occupant 40, the airbag 10 has a pair of side tethers 26. These side tethers 26 are each attached with one end to a first attachment point 28 on the first section 14 and with the other end to a second attachment point 29 on the second section 16. The side tethers 26 define a maximum distance between attachment points 28 and 29 and thus limit the extent to which the second section 16 can bulge toward the seat occupant 40. Without any external force acting on the airbag, the inflated airbag 10 would retain the triangular shape, even if the side tethers were removed. When, however, the seat occupant 40 contacts the enveloping volume 12, the side tethers 26 provide resistance against flattening of the airbag 10 by the inertial force exerted by the seat occupant 40.

Figure 2:
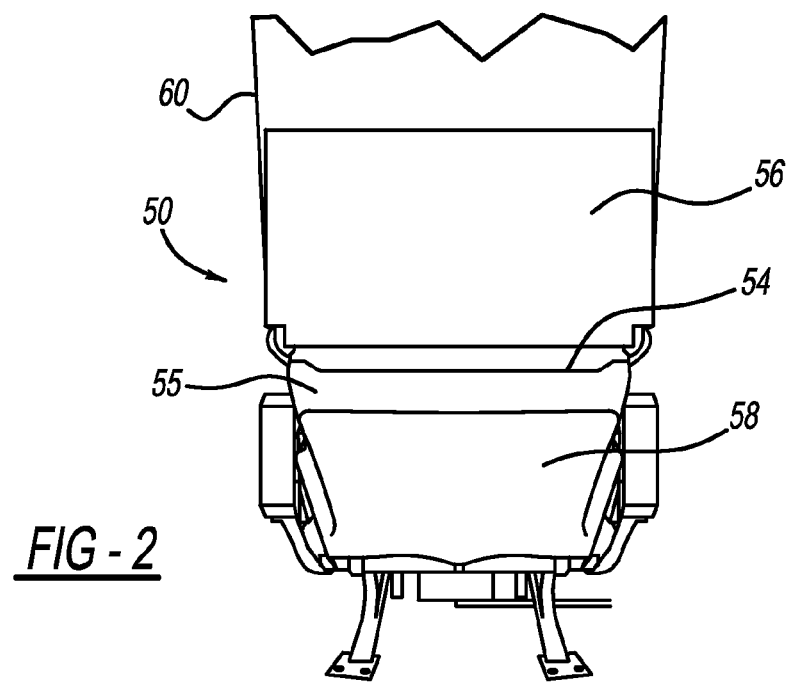
FIG. 2 shows an aircraft seat back containing the airbag of FIG. 1 in an uninflated state.

FIG. 2 illustrates where the airbag 10 of FIG. 1 can be accommodated in the seat back 60 of the aircraft seat 50 that also features a foldable tray table 56 above a seat pocket 58. A tear seam 54 extends horizontally across a seat cover 55 between the seat pocket 58 and tray table 56. The airbag 10 is mounted as a rolled bundle behind the tear seam 54 with a generally horizontal roll axis.

Figure 7:
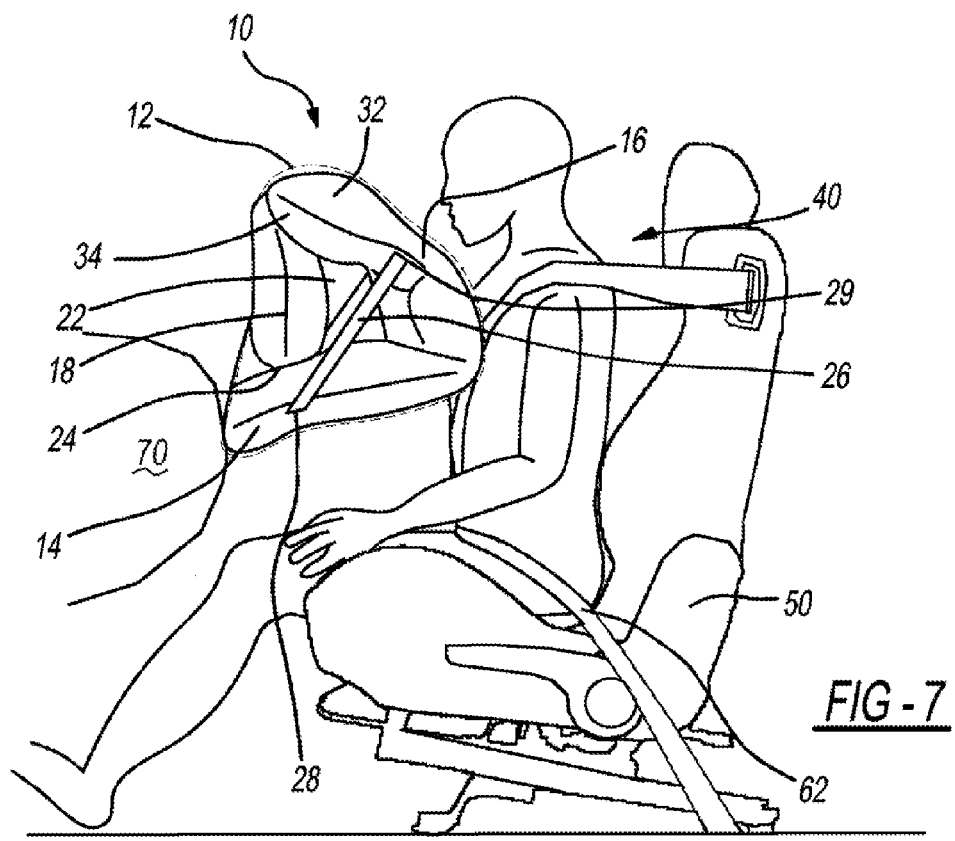
FIG. 7 shows an inflated airbag according to a fourth embodiment of the invention in an automotive vehicle.

Alternatively, a low-volume airbag, such as the airbag 10 shown in FIG. 1, may be mounted in an aircraft bulkhead or a vehicle dashboard as illustrated in FIG. 7

FIG. 7 shows the seat 50 as a front passenger seat in an automotive vehicle. The seat 50 is located behind a dashboard 70. The seat 50 features a three-point belt 62 securing a seat occupant 40 in the seat 50.

The dashboard 70 holds the airbag 10 that is inflated toward the seat occupant 40 during a deceleration event before the seat occupant 40 can make contact with the dashboard 70. In the embodiment of FIG. 7, the airbag 10 expands to the enveloping volume 12 with the generally triangular cross-section previously discussed in connection with FIG. 1. The enveloping volume 12 defines a volume that a conventional airbag would need to fill for providing outer surfaces that correspond to those of the shown embodiment. The airbag 10 of FIG. 7 corresponds to the airbag 10 of FIG. 1, and the description of FIG. 1 applies in analogy to FIG. 7.

Figure 3:
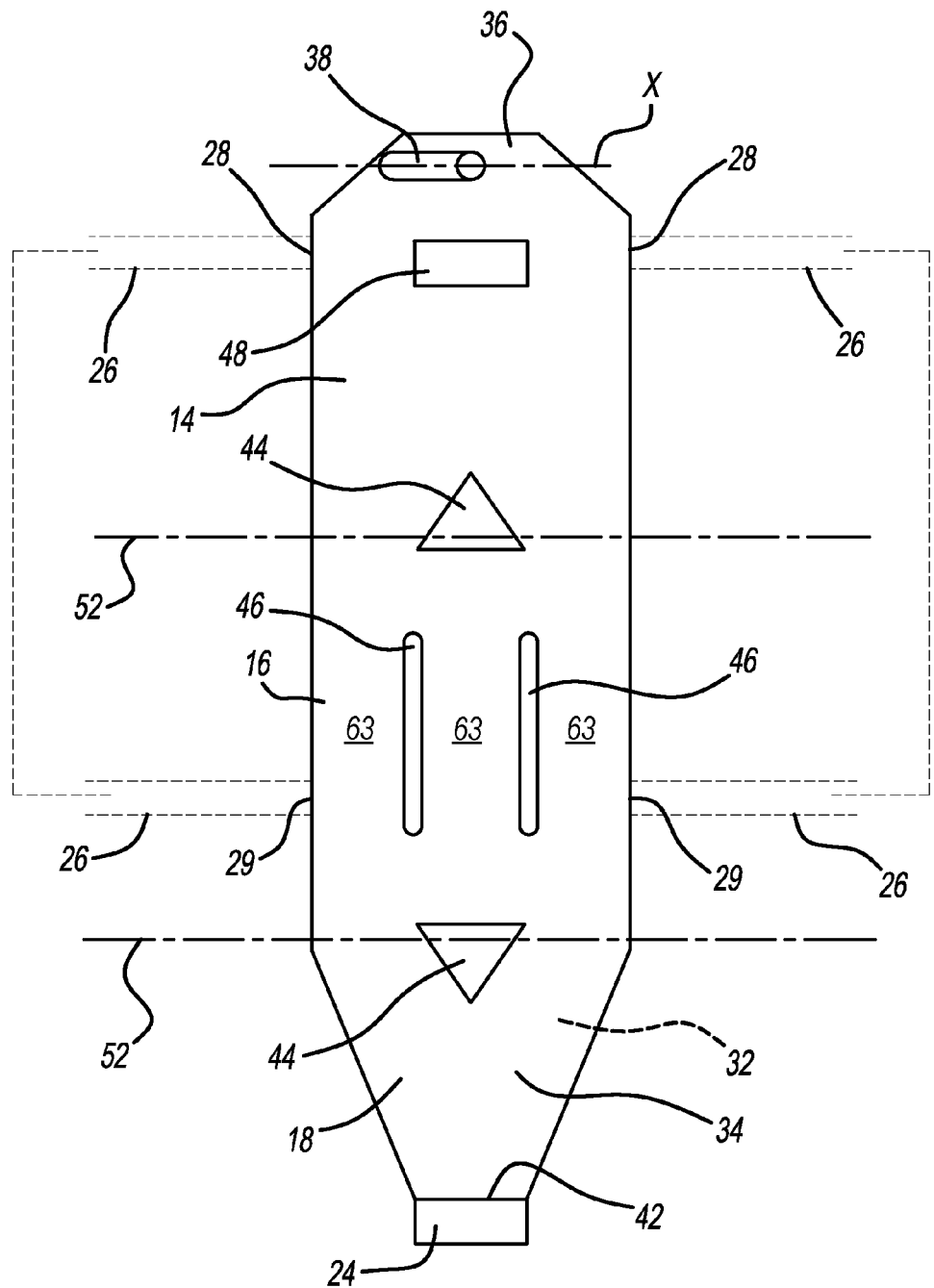
FIG. 3 is a plan view of the airbag shown in FIG. 1.

FIG. 3 shows details of the airbag of FIGS. 1 and 7. FIG. 3 shows a plan view of the deflated airbag 10 onto the inner fabric layer 34 before the third section 18 is attached to the first section 14 and before the side tethers 26 are attached to the second section 16 and the first section 14.

As evident from FIG. 3, the airbag 10 has an elongated shape with a first longitudinal end 36 being connected to a gas generator 38. While a pyrotechnical gas generator is shown, the gas generator 38 is representative for any device suitable to inflate the airbag 10. The gas generator 38 has an elongated, generally cylindrical shape with a cylinder axis x that extends substantially perpendicular to the longest dimension of the airbag 10. When the airbag 10 is rolled up for storage, the greatest dimension of the gas generator 38 thus extends parallel to the roll axis and allows a compact shape of the resulting bundle.

The end portion 24 forms a second longitudinal end opposite the first end 36. The end portion 24 is a flat portion that remains uninflated at all times. The outer fabric layer 32 remains attached to the inner fabric layer 34, for example via a seam 42 that shuts off any fluid connection of the end portion 24 with the remainder of the airbag 10. Alternatively, the outer and inner layers 32 and 34 may be connected by an adhesive, by interweaving, or by local laminating.

The airbag includes several other uninflated areas that form uninflated islands 44, 46, and 48 that may have been formed by similar methods as the uninflated end portion 24.

Islands 44 have a substantially triangular shape and have a width corresponding to about a third of the width of the airbag 10. The islands 44 define laterally extending bend axes 52 that form two corners of the substantially triangular inflated shape of the airbag 10. The bend axes 52 extend in the same direction as the roll axis. The islands 44 are located between the first section 14 and the second section 16 as well as between the second section 16 and the third section 18.

The islands 46 form a pair of strips extending in the general area of the second section 16 in the longitudinal direction of the airbag 10. The islands 46 thus create three longitudinal flow channels 62 that stiffen the second section 16.

The island 48 is located near the gas generator 38 in the first section 14 and has a size substantially corresponding to or larger than the end portion 24. During assembly of the airbag 10, the end portion 24 and the uninflated island 48 are sewn together or otherwise permanently attached to each other. If the end portion 24 is sewn onto the island 48, the island 48 can be created during the sewing process by the same seam that attaches the end portion 24 to the first section 14. Because the gas generator 38 is arranged closer to the first end 36 than the island 48, the gas generator 38 can be fastened to a frame or bracket (not shown) inside the seat back 60 without interfering with the inflation of the airbag 10 into its triangular contour.

The side tethers 26 are indicated by broken lines as originating from attachment points 28 on the first section 14 and attachment points 29 on the second section 16. Those side tethers 26 that are shown above each other in FIG. 3 are connected to each other or form a pair of unitary side tethers 26 as shown in FIG. 1.

Figure 4:
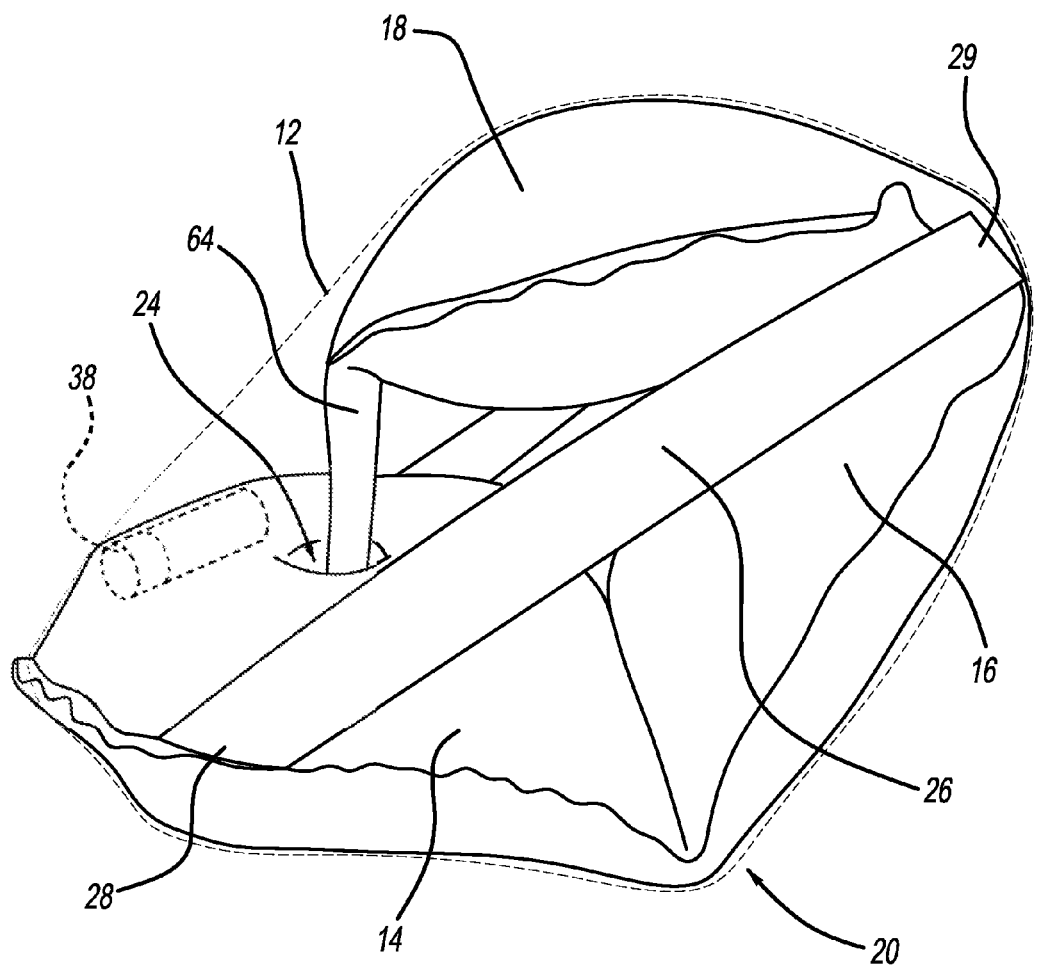
FIG. 4 shows an inflated airbag according to a first embodiment.
Figure 5:
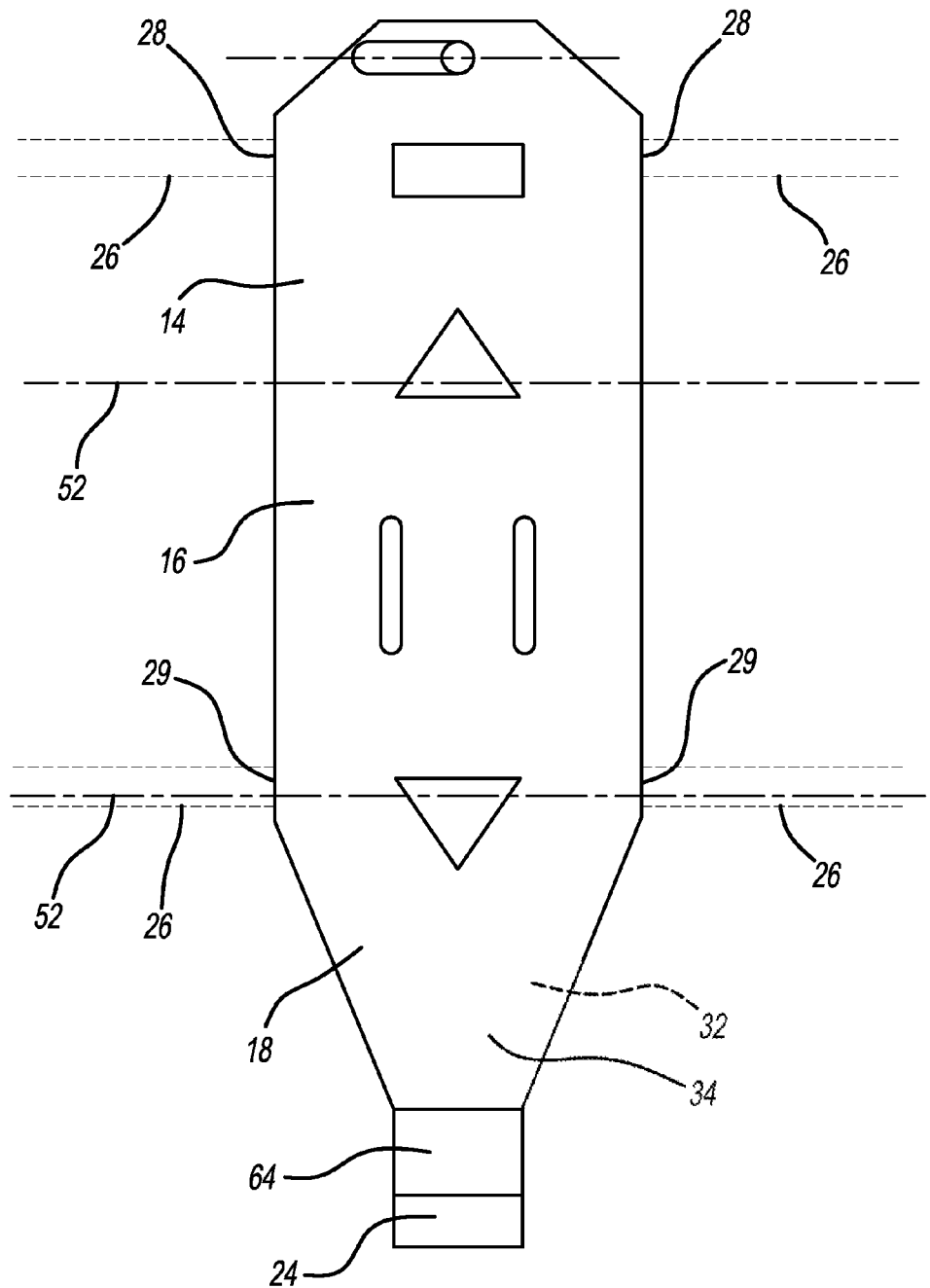
FIG. 5 is a plan view of the airbag shown in FIG. 4.

FIGS. 4 and 5 show an airbag 20 according to a second embodiment. FIG. 4 shows the airbag in the inflated state, while FIG. 5 provides a plan view onto the inner fabric layer 34. Airbag 20 is also based on the concept that the enveloping volume 12 is greater than the volume of the airbag itself, where the enveloping volume 12 defines a volume that a conventional airbag would need to fill for providing outer surfaces that correspond to those of the shown embodiment.

The outer contour of the enveloping volume 12 of airbag 20, however, resembles a quadrilateral shape rather than a triangle. This is due to the end portion 24 being connected to the third section 18 via an intermediate uninflated portion 64. This uninflated portion 64 acts like a tether that allows the third portion 18 to form a smaller angle relative to the first portion 14 and to extend nearly parallel to the first portion 14.

The side tethers 26 are attached to the attachment points 28 on the first section 14 as described in connection with FIG. 3. The attachment points 29 are moved compared to the embodiment of FIG. 3 to generally overlap with the bend axis 52 between the second section 16 and the third section 18. Due to the intermediate uninflated portion 64, the first section 14 and the second section 16 may be arranged at an obtuse angle relative to each other after inflation of the airbag 10. Accordingly, the side tethers may be longer than in the embodiment of FIGS. 1 and 3.

Figure 6:
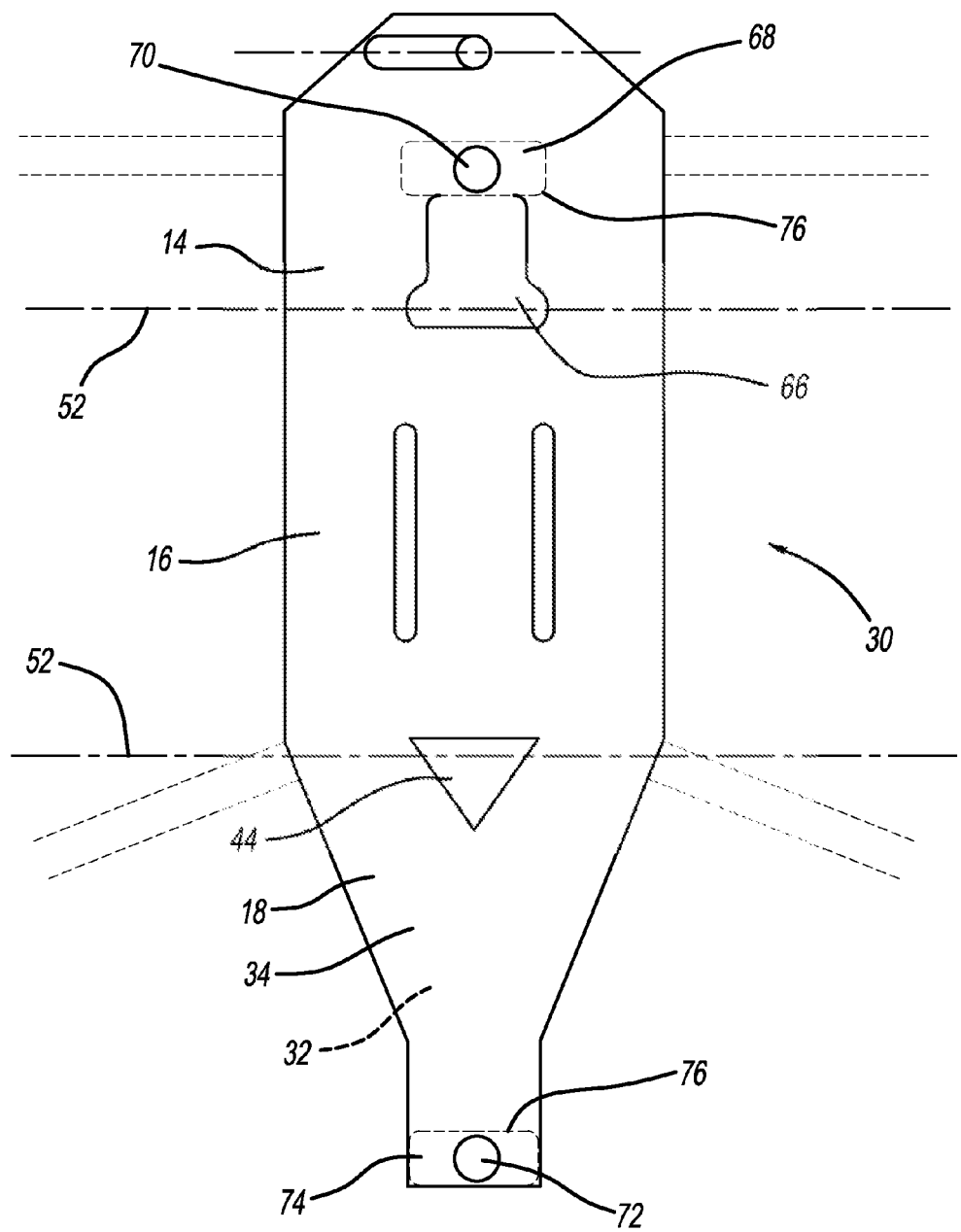
FIG. 6 is a plan view of a third embodiment.

Now referring to FIG. 6 a third embodiment of an airbag 30 is shown in a plan view onto the inner fabric layer 34. The airbag 30 has one of the uninflated islands 44 defining the bend axis 52 between the second section 16 and the third section 18. The other bend axis 52 between the first section 14 and the second section 16 is defined by an uninflated island 66 that generally extends from a port area 68 to the bend axis 52 between the first section 14 and the second section 16.

The port area 68 is shown as bounded by a broken line that indicates a seam 76 that does not extend through both the outer fabric layer 32 and the inner fabric layer 34. Instead, the port 70 is in fluid communication with the first section 14.

In a similar manner, an end portion 74 on the third section 18 has a port 72 in fluid communication with the third portion 18. Thus, the end portion 74 is not an uninflated area and is surrounded by seam 76 indicated by a broken line that does not extend through the outer fabric layer 32. Seam 76 connects the port area 68 on the first section with the end portion 74 on the third section so that the ports 70 and 72 are aligned in a substantially congruent manner and establish a flow path directly from the first section 14 to the third section 18, thereby bypassing the second section 16.

Thus, the airbag 30 of FIG. 6 provides a multi-throat fill concept with dual flow directions for simultaneous inflation of the second section 16 and the third section 18. In addition to increasing the inflation speed, this concept also reduces local gas pressure by diverting the gas generated by the gas generator into multiple areas of the airbag 30.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A frontal impact airbag with an outer fabric layer and an inner fabric layer, the airbag comprising:

three inflatable sections consisting of a first section, a second section, and a third section, the second section being in fluid communication with both the first and the third section;

a gas generator in fluid communication with the first section;

an end portion on the third section remote from the second section, the end portion being attached to the first section in an area between the gas generator and the second section, the first, second and third sections forming an enveloping volume defined by the outer fabric layer upon inflation of the airbag and an empty space defined by the inner fabric layer; and a first port on the first section and a second port on the third section, the first port and the second port being aligned with each other and providing a direct fluid communication between the first section and the third section.

2. The airbag of claim 1, further comprising at least one side tether attached to a first attachment point on the first section and to a second attachment point on one of the second and third sections or near transitional bend between the second and third section, thereby providing a resistance against flattening of the airbag after inflation.

3. The airbag of claim 1, wherein the first section and the third section are directly attached to each other.

4. The airbag of claim 3, wherein the first section and the third section are attached to each other by a seam.

5. The airbag of claim 3, wherein the first section and the third section are attached to each other by an adhesive.

6. The airbag of claim 3, wherein the first section and the third section are attached to each other by lamination.

7. The airbag of claim 1, further comprising first uninflated islands defining a first bend axis between the first section and the second section and a second bend axis between the second section and the third section.

8. The airbag of claim 1, further comprising strip-shaped second uninflated islands on the second section, the strip-shaped uninflated islands stiffening the second section.

9. The airbag of claim 1, wherein the airbag has a roll axis and wherein the gas generator has an elongated shape extending substantially parallel to the roll axis.

10. The airbag of claim 9, wherein the gas generator has a generally cylindrical shape with a cylinder axis extending substantially parallel to the roll axis.

* * * * *